V. J. ODHNER.
TRANSFER MECHANISM OF CALCULATING MACHINES.
APPLICATION FILED APR. 24, 1919.
1,355,565.
Patented Oct. 12, 1920.
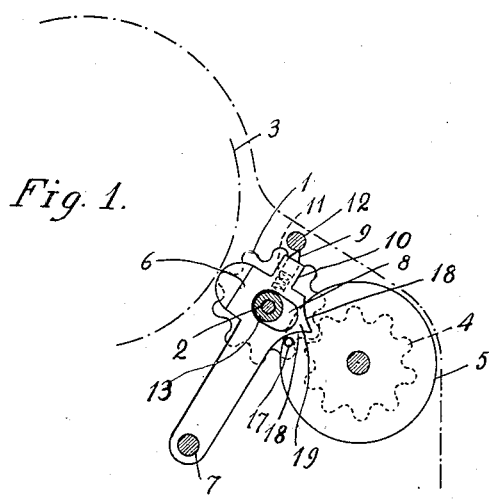
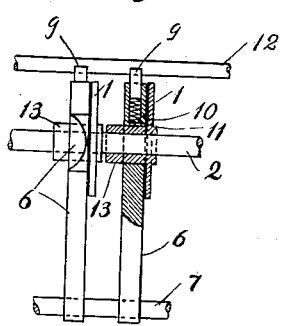
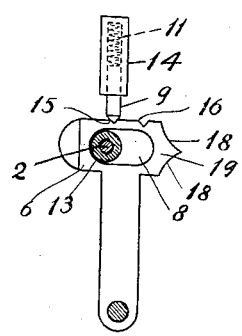
Inventor
V. J. Odhner
By L. R. Kerslake
Atty.

UNITED STATES PATENT OFFICE.

VALENTIN JAKOB ODHNER, OF STOCKHOLM, SWEDEN.

TRANSFER MECHANISM OF CALCULATING-MACHINES.

1,355,565.

Specification of Letters Patent.

Patented Oct. 12, 1920.

Application filed April 24, 1919. Serial No. 292,458.

*To all whom it may concern:*

Be it known that I, VALENTIN JAKOB ODHNER, a subject of the King of Sweden, and resident of Karlaplan 2, Stockholm, in the Kingdom of Sweden, have invented certain new and useful Improvements in Transfer Mechanism of Calculating-Machines, of which the following is a specification, reference being had therein to the accompanying drawing.

In calculating machines hitherto used the so called "ten" transmitting arms which move the "ten" pin, "hundred" pin etc. of the calculating wheels into operative position, are held in their operative and inoperative positions respectively by a catch slidably mounted in the said arm and acted upon by a spring. The said catch coöperates with the shaft of the intermediate wheels, which transmit motion from the pins of the calculating wheels to the registering wheels and the indicating disks and the operating part of which is wedge-shaped, so that the catch, when it arrives at the opposite side of the said shaft, aids in shifting the "ten" transmitting arm. A catching device of the said type is shown and described in the U. S. Letters Patent No. 514725. The "ten" transmitting arm, which is located between two intermediate wheels and embraces with a slot the shaft of the intermediate wheels, intrudes upon the space for the hubs of the intermediate wheels by the said catching device, so that the said hubs are very short, which involves the disadvantage of the hubs of the intermediate wheels becoming worn very quickly and the machine operating in an unreliable manner. Besides, the stroke of the "ten" transmitting arm is dependent on the width of the said shaft, for which reason the said stroke is unnecessarily long. For the removing of the said disadvantages the said catch coöperates according to this invention with a part located outside the shaft of the intermediate wheels, so that the hubs of the said wheels may be extended into the slots of the "ten" transmitting arms and the extent of the stroke of the arms may be adapted at will. According to the invention the cam surfaces of the "ten" transmitting arms, which are acted upon by the pins, provided on the indicating disks, for shifting the arms into the operative position, are so shaped, that they facilitate the overcoming of the resistance effected by the catching device at the starting of the shifting of the arm into its operative position.

In the accompanying drawing two forms of the invention are shown as examples. Figure 1 is a side view of the "ten" transmitting arm and adjacent parts of the calculating machine. Fig. 2 shows the same parts viewed from one edge of the "ten" transmitting arm. Fig. 3 is a side view of a second form of the catching device.

1 is an intermediate wheel, which is rotatably mounted on the shaft 2 and is turned by the projecting pin or pins of the calculating wheels indicated by the dotted line 3. The said intermediate wheel 1 meshes with the registering wheel 4, connected or made integral with the indicating disk 5. 6 is the "ten" transmitting arm, fulcrumed on a rod 7. The head of the said arm 6 embraces the shaft 2 with a slot 8. In the form of the invention, shown in Figs. 1 and 2, the wedge shaped catch 9 for holding the arm 6 in its inactive and active positions is located in a sleeve shaped part 10 projecting from the arm, which incloses also the spring 11, actuating the catch. The catch 9 coöperates with a rod 12 extending along the set of arms 6. Owing to this arrangement of the catching device the hubs 13 of the intermediate wheels may be extended into the slots 8 of the heads of the arms 6, as shown. The hubs thus get a considerable length, which results in their withstanding wearing and consequently in the intermediate wheels being guided in a reliable manner for a long period. Owing to the fact that the rod 12 may be considerably thinner than the shaft 2 and besides is located at a greater distance from the fulcrum of the arm 7 than the shaft 2, the movement of the arm 2 from one of the positions to the other in which it is locked is considerably shorter than in calculating machines hitherto used. By adapting the width of the rod 12 or the distance between the same and the rod 7 the stroke of the arm 2 may be adapted at will.

According to Fig. 3, which shows the preferred form of execution, the catch 9 is located in a sleeve 14, which is fixed in the ordinary carriage, which carries the intermediate wheels, the registering wheels and the "ten" transmitting arms 6. The said sleeve also contains the spring 11 actuating the catch. The said catch coöperates with two notches 15, 16 provided in the top edge of the head of the arm 6, which notches correspond to the inactive and active positions respectively of the arm. The hub of the intermediate wheel 13 extends into the slot 8 of the arm 6 in the same manner as shown in Figs. 1 and 2. In this case the stroke of the arm 6 from one of the positions to the other, in which it is locked, is determined by the distance between the notches 15 and 16.

The arm 6 is brought into its operative position by a pin 17 on the indicating disk 5 in the ordinary manner. The catching device effects its greatest resistance against the shifting of the arm during the first part of its movement. As soon as the catch 9 has reached a position on the opposite side of the rod 12, Figs. 1 and 2, and slightly remote from the lowermost part of the same, the catch itself aids in swinging the arm. As soon as the catch 9 has left the catch 15 or 16, Fig. 3, only the sliding friction between the catch and the arm 6 must be overcome during the continued movement of the arm. In order to facilitate the moving of the arm 6 during the first part of its shifting the cam surfaces 18 of the head of the arm 6, coöperating with the pin 17 are not straight, as hitherto, but concave in such manner, that the slanting plane, on which the pin 17 slides during the first part of the shifting of the arm 6, has a slight inclination, as shown in Fig. 1. The inclination of the cam surface then increases, in order that the projection 19 of the head, on which the cam surfaces are provided, may have a sufficient length for insuring the shifting of the arm into its operative position. Owing to the fact that the length of the stroke of the arm 6 may be reduced to a minimum in consequence of the construction of the catching device, the length of the projection 19 also is very slight. In consequence hereof the incline of the cam surfaces may be considerably slighter than in calculating machines hitherto used, which also contributes in reducing the force necessary for shifting the arm 6. The returning of the arm 6 into the inactive position may be effected by a cam piece on the calculating wheel, in the ordinary manner.

The invention may evidently be modified in many other respects without exceeding the limits of the same.

Having now described my invention, what I claim as new and desire to secure by Letters Patent is:

1. In a calculating machine in combination, a shaft, intermediate gear wheels having their hubs connected thereto, swingable "ten" transmitting arms adapted for shifting the "ten" pin, "hundred"-pin, etc., of the calculating machine into operative position and provided with slots for permitting of the arrangement of the arms about the hubs of the intermediate wheels, and coactive means on the arms and outside of the arms for holding the "ten" transmitting arms in operative and inoperative positions, said means including stops and spring pressed plugs.

2. In a catching device for the swingable "ten" transmitting arms of calculating machines, shifting the "ten" pin, "hundred" pin etc. of the calculating wheels into operative position, the combination of a sleeve, located outside the said arm, a wedge-shaped plug, sliding in the said sleeve, a spring located in the sleeve and actuating the said plug, and notches provided in the "ten" transmitting arm and coöperating with the said plug, substantially as described.

In witness whereof, I have hereunto signed my name.

VALENTIN JAKOB ODHNER.